United States Patent [19]

Ferry

[11] Patent Number: 4,742,262

[45] Date of Patent: May 3, 1988

[54] ACCELEROMETER, IN PARTICULAR FOR THE DETECTION OF PINKING IN AN INTERNAL COMBUSTION ENGINE

[75] Inventor: Jacques Ferry, Croix-Nivert, France

[73] Assignee: Equipements Automobiles Marchal, France

[21] Appl. No.: 37,013

[22] Filed: Apr. 10, 1987

[30] Foreign Application Priority Data

Apr. 14, 1986 [FR] France .................................. 86 05271

[51] Int. Cl.⁴ ............................................. H01L 41/08
[52] U.S. Cl. ..................................... 310/329; 310/326; 310/346; 73/35
[58] Field of Search ............... 310/326, 327, 329, 346; 73/35

[56] References Cited

U.S. PATENT DOCUMENTS

| | | | |
|---|---|---|---|
| 3,506,857 | 4/1970 | Tolliver et al. | 310/329 |
| 3,586,889 | 6/1971 | Kolter | 310/329 |
| 3,984,790 | 10/1976 | Tanaka | 310/326 X |
| 4,302,964 | 12/1981 | Sawada et al. | 73/35 |
| 4,354,131 | 10/1982 | Kaji | 310/328 |
| 4,502,332 | 3/1985 | Sheridan et al. | 73/35 X |
| 4,637,246 | 1/1987 | Lombard et al. | 310/329 X |
| 4,660,409 | 4/1987 | Miyata et al. | 310/346 X |

FOREIGN PATENT DOCUMENTS 2550346 2/1985 France .
1561110 2/1980 United Kingdom .

OTHER PUBLICATIONS

Patents Abstract of Japan, vol. 7, No. 238, (p. 238 (p. 231) [1383]; Oct. 22, 1983-JP-A-58 124958, Mitsubishi Denki K.K.

Primary Examiner—Mark O. Budd
Attorney, Agent, or Firm—Cushman, Darby & Cushman

[57] ABSTRACT

The accelerometer comprises: a body intended to be fixed on a component, such as an internal combustion engine cylinder head, whose accelerations or vibrations are to be detected; a piezoelectric element prestressed between the body and a seismic mass; and flexible electrical conductor means between two opposite faces of the piezoelectric element and the terminals of an electrical connector mounted on the accelerometer body, provision being moreover made for an electrical connection between the respective faces of the piezoelectric element and the adjacent parts of the accelerometer. The electrical connector means is mounted on the body of the accelerometer by means of the damping means capable of reducing or suppressing the mechanical transmission of the vibrations or accelerations from the accelerometer body to the connector.

15 Claims, 1 Drawing Sheet

ACCELEROMETER, IN PARTICULAR FOR THE DETECTION OF PINKING IN AN INTERNAL COMBUSTION ENGINE

FIELD OF THE INVENTION

The invention relates to an accelerometer of the type comprising, on the one hand a body intended to be fixed on a component whose accelerations or vibrations are to be detected, on the other hand a prestressed piezoelectric element between the body and a seismic mass, and furthermore flexible electrical connection means between the opposite faces of the piezoelectric element and the terminals of a connector on the accelerometer body. Insulating means may also be provided between the faces of the piezoelectric element and the adjacent parts of the accelerometer.

The invention concerns more particularly, but not exclusively, an accelerometer for the detection of pinking in an internal combustion engine, because it seems that it is in this case that its application should be most worthwhile.

PRIOR ART

Using accelerometers for such application, it has been found that interference phenomena in the electric signals picked up at the connector terminals impede the reading of the signals corresponding to the vibrations or accelerations to be detected.

OBJECT OF THE INVENTION

The primary object of the invention is to provide an accelerometer of the kind defined above which would meet the various practical requirements better than heretofore, and which would in particular allow a substantial reduction of the interference phenomena which impede the reading of the vibrations or accelerations to be detected.

It is a further object to improve the service life and reliability of the accelerometer.

SUMMARY OF THE INVENTION

In accordance with the invention, an accelerometer, in particular for the detection of pinking in an internal combustion engine, of the kind defined above is characterised in that the connector is mounted on the accelerometer body with the aid of damping means capable of reducing or suppressing the mechanical transmission of the vibrations or accelerations from the accelerometer body to the connector.

The damping means may also constitute sealing means between the connector and the accelerometer body.

Advantageously, the damping means may comprise an element made of an elastomeric or equivalent material. This element preferably comprises an annular portion disposed between two transverse sides, close to each other, appertaining respectively to the accelerometer body and to the connector.

In an advantageous embodiment, the accelerometer body comprises a shell or external sides extending parallel to the axis of the accelerometer, intended to receive internally a skirt, in particular, a cylindrical skirt, constituting an extension of the connector. The element of elastomeric or equivalent material constituting the damping means, then comprises a sleeve disposed between the skirt on the one hand and the shell or the sides on the other hand, this sleeve being provided at its end situated within the skirt with the above-mentioned annular portion.

The accelerometer body can have a polygonal contour whilst the skirt of the connector has a cylindrical shape; the sleeve of elastomeric or equivalent material can then have on its external surface, radially outwardly projecting beads capable of being inserted in the internal corner zones of the accelerometer body.

Advantageously, the body may comprise tongues capable of being folded down into cut outs of the sleeve, in order to lock the body and sleeve against relative rotation. In the case of a body having a polygonal shape these tongues can be provided at the level of the apices of the polygon.

Preferably, the flexible electrical connection means are arranged to set up a damping effect. Each electrical connection means may comprise a block of elastomeric or equivalent material which is electrically conducting by virtue of a charge of an appropriate material, this block having two opposite faces on which the contacts bear. In particular the contacts may be in a tapered form joined respectively to one face of the piezoelectric element and to one of the terminals of the connector.

A receptacle may be provided, instead of the block of the elastomeric or equivalent material, in one of the components constituted by the connector or the accelerometer body, and this receptacle may be filled by a gel charged with small metallised balls of glass or equivalent material, to set up the electrical connection between the contacts.

In another possibility, the block of elastomeric or equivalent material of the electrical connection means, is arranged to operate by way of traction between the above-mentioned contacts.

BRIEF DESCRIPTION OF THE DRAWINGS

Apart from the features set out above, the invention further consists of several other characteristics which will be discussed in greater detail below in relation to a particular embodiment described with reference to the attached drawings but intended to be in no way restrictive.

DESCRIPTION OF THE PREFERRED EMBODIMENT

Figure 1:
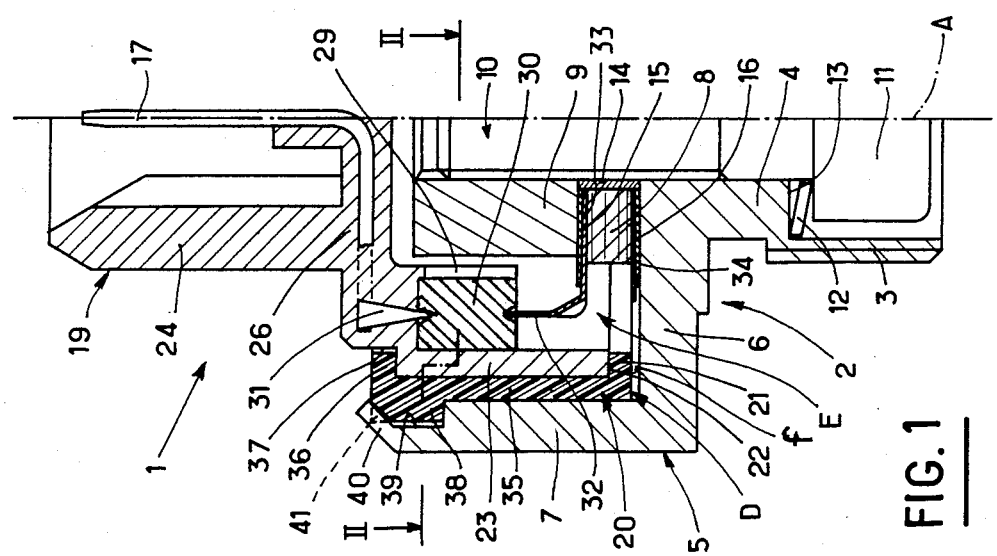
FIG. 1 is an axial half cross-section, taken along the line I—I of FIG. 2, of an accelerometer in accordance with the invention.

Referring to the drawings, and especially to FIG. 1, there can be seen an accelerometer 1, which is more particularly intended for the detection of pinking of an internal combustion engine, comprising a body 2 intended to be fixed on a component whose accelerations or vibrations are to be detected. This body 2 comprises in its lower portion an externally threaded sleeve 3 for being fixed in a tapped hole of the component in question. The sleeve 3 is joined by a smaller diameter cylindrical neck 4 to a kind of cup 5 opening on the opposite side remote from the sleeve 3. The cup 5 comprises a transverse bottom 6 which is, in the example considered, of a hexagonal perimeter (see FIG. 2), and sides 7 which are integral with the bottom 6 and extend parallel to the axis A of the accelerometer, orthogonal to the median plane of the bottom 6 and in the zone of the apices of the polygonal perimeter of the bottom.

The accelerometer 1 comprises an annular piezoelectric element 8, prestressed between the transverse bottom 6 of the body 2 and a seismic mass 9. This mass 9 may be an annular ring comprising a tapped bore capable of cooperating with the threaded end of a screw 10 whose stem passes through the passage delimited by the neck 4 and the piezoelectric element 8. The head 11 of the screw 10 is accommodated in the space bounded by the sleeve 3. An elastic metallic washer 12 is compressed between, on the one hand the shoulder formed by the set back between the head 11 and the stem of the screw 10 and, on the other hand the shoulder 13 provided transversely in the bottom of the internal space of the sleeve 3. An insulating sleeve 14 is accommodated within the opening of the piezoelectric element 8 and surrounds the stem of the screw 10.

Provision is made for flexible electrically conductive means E between the opposite faces 15, 16 of the piezoelectric element 8 and the terminals formed by pins 17 and 18 of electrical connector means in the form of a connector 19 mounted on the accelerator body 2.

The connector 19 is mounted on the body 2 by means of damping means D capable of reducing or suppressing the mechanical transmission of vibrations or accelerations from the body 2 to the connector 19. Advantageously, the damping means D also constitute sealing means between the connector 19 and the accelerometer body 2.

These damping means D comprise an element 20 of an elastomeric or equivalent material comprising an annular portion 21 disposed between two transverse faces close to each other and formed respectively by the internal transverse side of the bottom 6 of the accelerometer body 2 and the transverse end side 22 of a cylindrical skirt 23 constituting an extension of the connector 19. This connector comprises a socket 24 of a substantially rectangular shape, as may be seen in FIG. 2, whose walls are parallel to the axis A, this socket being open at the end remote from the threaded sleeve 3. The walls of the socket 24 surround and protect the connector pins 17 and 18. The socket 24 is capable of receiving a male connector plug (not shown). Guide ribs 25 (FIG. 2) may be provided, parallel to the axis A, on the internal surface of the socket 24 to cooperate with corresponding grooves provided in the above-mentioned plug. The socket 24 comprises a transverse bottom 26 which projects externally beyond the perimeter of this socket to ensure the transition to the cylindrical skirt 23.

On the side pointing towards the bottom 6 of the body 2, this socket bottom 26 is provided with two diametrically opposed recesses such as 27 (FIG. 2) which are cylindrical in shape and open along the axial direction on the side of the bottom 6. The walls 28 delimiting these recesses 27 project radially inwardly in relation to the internal surface of the skirt 23 and become inserted in the annular space between the external surface of the seismic mass 9 and the internal cylindrical surface of the skirt 23. The circular arc-shaped walls 28 delimiting one and the same recess 27 are separated by a gap 29 (FIG. 2) extending parallel to the axis A and whose median line is situated in the plane passing through the axis A and the axis of the recess 27.

The electrically conductive means E comprise a conductive block 30 of an elastomeric or equivalent material, disposed in each recess 27; one block 30 is connected to each face 15, 16 of the element 8. The material of the elastic block 30 may be rendered electrically conductive by an appropriate charge, particularly by a charge of small metallic balls. Instead of a block of an elastomeric material, a silicone block charged with metallic flakes, or a conductive gel charged for instance with small metallic glass balls, could be used in which latter case, the recess 27 could be closed at the side pointing towards the bottom 6. Each block 30 comprises two opposite faces, against which the metallic contacts or lugs 31, 32, in particular of a tapered shape terminating in a point penetrating into the material of the block 30, bear. The contact 31 is connected (by a conductive strip embedded in the material of the connector 19) to one of the pins of this connector, for example, the pin 17 in the case of the contact 31 which my be seen in FIG. 1. The contact 32 can be formed by a radial extension of a metallic washer 33, the extension being bent substantially at right angles in relation to the plane of the washer. This metallic washer 33 is in electrical contact with the face 15 of the piezoelectric element 8. The other face 16 of this piezoelectric element 8 is in electric contact with another washer 34 which is electrically connected to a further contact which is similar to the contact 32 of FIG. 1 but is diametrically opposite to it. This diametrically opposite similar contact (not shown) electrically connects the fce 16 and the other pin 18 of the connector.

Electrical insulation means, such as an insulating varnish or similar, may be used to insulate the various contacts, electrically conducting washers etc . . . and the faces 15, 16 of the piezoelectric element 8, in relation to the other components of the accelerometer.

The element 20 of elastomeric material, forming part of the damping means D, is advantageously formed by a cylindrical sleeve 35 which surrounds the skirt 23 of the connector and is provided, at its axial end nearer the bottom 6 of the annular component 21, with a kind of transverse washer intended to constitute an axial stop. Axial play f (FIG. 1) exists between the transverse external face of the component 21 and the opposite transverse face of the bottom 6.

At its other end, the sleeve 35 is provided with a radially inwardly projecting annular component 36 accommodated in a peripheral recess 37 on the external surface of the connector 19.

In the vicinity of the apices of the polygonal perimeter of the cup 5, the sleeve 35 comprises, near its end 36, radially outwardly projecting beads 38 capable of being inserted in recesses such as 39 (FIG. 1) provided in the internal zones of the apical corners of the perimeter of the cup 5 at the ends of the sides 7 remote from the bottom 6.

The ends of the sides 7 are in the form of tongues 40 capable of being folded against the external faces of the beads 38 to hold the sleeve 35. Preferably, each bead comprises on its external surface, a recess 41 capable of accommodating the folded tongue 40 thereby ensuring rotational self-locking of the connector 19 in relation to the body 2.

The assembly and mounting of the accelerometer follow directly from the preceding explanations.

It should be noted that the body 2 may be constituted by a cup having a continuous external wall forming a shell instead of the sides 7 described above.

The damping means D and the flexible electrically conductive means E described above make it possible to separate as far as possible the function of generating the signal produced at the piezoelectric element 8 from the function of the external connection.

The connector 19 is mounted in the manner of a piston in the accelerometer body 2, the annular part 21 and the sleeve 35 of elastomeric material constituting a segment performing a damper function. One or several O-rings could just as well be used instead.

The electrical connection ensured by means of the blocks 30 of an elastomeric or equivalent material contributes to the damping effect sought in the unit.

Such a set-up makes it possible in particular, to prevent resonance of the unit in a frequency range which can extend from 1 Khz to 20 Khz.

Figure 2:
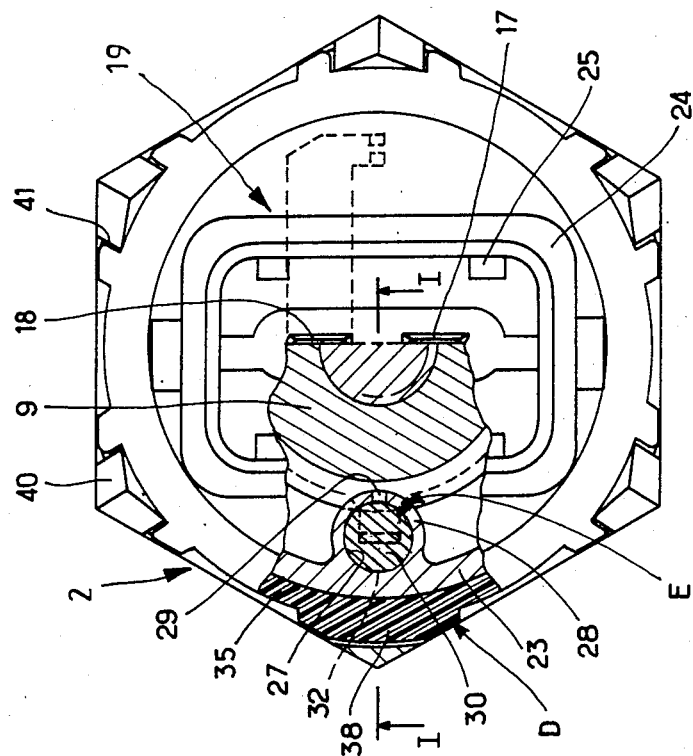
FIG. 2 is a top view in relation to FIG. 1 with the section taken along line II—II of FIG. 1.

There are several possible variants from the description of the embodiment of the FIGS. 1 and 2, within the scope of the invention.

The block 30 of elastomeric material operating with the flexible electrical connection means, could work by way of traction instead of working by compression between the contacts or lugs 31, 32. This block would comprise at its ends, heads formed by bulges, these heads being intended to be received in openings provided in the connecting lugs, the block of elastomeric material being stretched mechanically between these lugs.

Instead of having an outlet terminal 17 in a plane containing the axis A, or at least parallel to such a plane, the connector 19 could instead have an outlet along a different direction, in particular a direction at right angles in relation to the axis A.

The damping effect between the accelerometer body and the connector, obtained in an accelerometer in accordance with the invention, allows the interference phenomena in the received signals to be substantially reduced. This damping also contributes towards increasing the service life of the accelerometer, and to maintaining the accuracy and reliability of the measurements in the course of time.

In some ways, it may be considered that the damping means D comprise (i) axial damping means formed by the annular portion 21 and, if applicable, the annular portion 37, as well as (ii) radial damping means formed by the sleeve 35. These axial and radial damping means could be separated from each other; although they are preferably used simultaneously, it would be possible to use only an axial damping or a radial damping, as the case may be. It should also be noted that the damping means could be provided between surfaces which are oblique in relation to the axis A, in which case, one and the same damping means would simultaneously have axial and radial effects.

I claim:
1. An accelerometer comprising:
   (a) a body intended to be fixed on a component whose accelerations or vibrations are to be detected;
   (b) a seismic mass;
   (c) means mounting said seismic mass for movement relative to said body;
   (d) piezoelectric means prestressed between said body and said seismic mass and arranged so as to be strained variably by relative movement between said body and said seismic mass;
   (e) electrical connector means mounted on said body and having terminal means, said electrical connector means including a mounting skirt constituting an extension thereof;
   (f) respective electrically conductive means between each of the opposed faces of the piezoelectric means and the terminal means of said electrical connector means;
   (g) electrical insulating means between the piezoelectric means and adjacent parts of the accelerometer; and
   (h) damping means mounting said electrical connector means on said body of the accelerometer, said damping means comprising a sleeve element made from a material which is one of the group consisting of elastomeric material and an equivalent material and being capable of reducing or suppressing the mechanical transmission of the vibrations or accelerations from the body of the accelerometer to the electrical connector means, said sleeve element including, adjacent one end thereof, radially outwardly projecting beads capable of being inserted in corresponding recesses provided in the accelerometer body, said sleeve further including in annular portion extending between an internal transverse face of a bottom of the accelerometer body and a transverse end side of said cylindrical skirt of said electrical connector means, and spaced from said internal transverse face such that a gap for axial play is defined between the transverse external face of said annual portion and said internal transverse face of the bottom of the accelerometer body.

2. An accelerometer according to claim 1, wherein said damping means also constitute sealing means between the electrical connector means and the body of the accelerometer.

3. An accelerometer according to claim 1, wherein said body comprises a shell extending parallel to the axis of the accelerometer, for receiving said skirt therein; the damping means sleeve element is disposed between said skirt and said shell; and said annular portion is at that end of said sleeve which is situated inside the body.

4. An accelerometer according to claim 3, wherein said sleeve is cylindrical.

5. An accelerometer according to claim 1, wherein said electrical connector means includes a mounting skirt constituting an extension thereof; wherein said body comprises external sides extending parallel to the axis of the accelerometer, intended to receive internally said skirt; wherein the damping means element comprises a sleeve disposed between said skirt and said external sides; and wherein said annular portion is at that end of said sleeve which is situated inside the body.

6. An accelerometer according to claim 5, wherein said sleeve is cylindrical.

7. An accelerometer comprising:
   (a) a body intended to be fixed on a component whose accelerations or vibrations are to be detected, said body comprising a shell which extends parallel to the axis of the accelerometer and has a polygonal perimeter;
   (b) a seismic mass;
   (c) means mounting said seismic mass for movement relative to said body;
   (d) piezoelectric means prestressed between said body and said seismic mass and arranged so as to be strained variably by relative movement between said body and said seismic mass;
   (e) electrical connector means mounted on said body and having terminal means, said electrical connector means including a mounting skirt constituting an extension thereof, said skirt having a cylindrical shape and being received in said shell;
   (f) respective electrically conductive means between each of the opposed faces of the piezoelectric means and the terminals means of said electrical connector means;

(g) electrical insulating means between the piezoelectric means and adjacent parts of the accelerometer; and (h) damping means mounting said electrical connector means on said body of the accelerometer, said damping means comprising a sleeve element made from a material which is one of the group consisting of elastomeric material and an equivalent material disposed between said shell and said skirt and being capable of reducing or suppressing the mechanical transmission of the vibrations or accelerations from the body of the accelerometer to the electrical connector means, said sleeve element including, adjcent one end thereof, radially outwardly projecting beads capable of being inserted in corresponding recesses provided in the internal zones of the angles of the polygonal perimeter of said body of the accelerometer, said sleeve further including an annular portion at the end thereof within said body which extends between an internal transverse face of a bottom of the accelerometer body and a transverse end side of said cylindrical skirt of said electrical connector means, and spaced from said internal transverse face such that a gap for axial play is defined between the transverse external face of said annual portion and said internal transverse face of the bottom of the accelerometer body.

8. An accelerometer comprising:
(a) a body intended to be fixed on a component whose accelerations or vibrations are to be detected, said body comprising a shell which extends parallel to the axis of the accelerometer;
(b) a seismic mass;
(c) means mounting said seismic mass for movement relative to said body;
(d) piezoelectric means prestressed between said body and said seismic mass and arranged so as to be strained variably by relative movement between said body and said seismic mass;
(e) electrical connector means mounted on said body and having terminal means, said electrical connector means including a mounting skirt constituting an extension thereof, said skirt being received in said shell;
(f) respective electrically conductive means between each of the opposed faces of the piezoelectric means and the terminal means of said electrical connector means;
(g) electrical insulating means between the piezoelectric means and adjacent parts of the accelerometer; and
(h) damping means mounting said electrical connector means on said body of the accelerometer, said damping means comprising a sleeve element made from a material which is one of the group consisting of elastomeric material and an equivalent material disposed between said shell and said skirt and being capable of reducing or suppressing the mechanical transmission of the vibrations or accelerations from the body of the accelerometer to the electrical connector means, said sleeve element including, adjacent one end thereof, radially outwardly projecting beads capable of being inserted in corresponding recesses provided in the accelerometer body, said sleeve further including an annular portion at the end thereof within said body which extends between an internal transverse face of a bottom of the accelerometer body and a transverse end side of said cylindrical skirt of said electrical connector means, and spaced from said internal transverse face such that a gap for axial play is defined between the transverse external face of said annual portion and said internal transverse face of the bottom of the accelerometer body, said sleeve element including means defining external recesses thereof; and said body including tongues adapted to be folded down into said recesses of the sleeve element for ensuring rotational locking between the sleeve element and the body.

9. An accelerometer according to claim 7, wherein said sleeve element includes means defining external recesses thereof; said body including tongues adapted to be folded down into said recesses of the sleeve element for ensuring rotational locking between the sleeve element and the body; and wherein the tongues are provided in the vicinity of the apices of the polygon constituting the perimeter of said body of the accelerometer.

10. An accelerometer according to claim 1, wherein the flexible electrically conductive means are arranged to set up a damping effect.

11. An accelerometer comprising:
(a) a body intended to be fixed on a component whose accelerations or vibrations are to be detected;
(b) a seismic mass;
(c) means mounting said seismic mass for movement relative to said body;
(d) piezoelectric means prestressed between said body and said seismic mass and arranged so as to be strained variably by relative movement between said body and said seismic mass;
(e) electrical connector means mounted on said body and having terminal means;
(f) respective electrically conductive means between each of the opposed faces of the piezoelectric means and the terminal means of said electrical connector means;
(g) electrical insulating means between the piezoelectric means and adjacent parts of the accelerometer; and
(h) damping means mounting said electrical connector means on said body of the accelerometer, said damping means being capable of reducing or suppressing the mechanical transmission of the vibrations or accelerations from the body of the accelerometer to the electrical connector means, the flexible electrically conductive means being arranged to set up a damping effect, the terminal means of said electrical connector means comprising a pair of pins; and said electrically conductive means comprising:
(a) a pair of blocks of a material selected from the group comprising elastomeric materials and an equivalent material and including a charge of an appropriate additional material to render said selected material electrically conductive, said block having first and second opposite faces; and
(b) two pairs of contacts abutting each pair including a first contact abutting said first opposite face of the associated said block and connected to one face of the piezoelectric means, and a second contact abutting said second opposite face of the said associated block and connected to one of the pins of the electrical connector means.

12. An accelerometer according to claim 11, wherein said electrical connector means comprises a bottom disposed adjacent the bottom of said body, said bottom of the electrical connector means including means defining two cylindrically shaped recesses having walls which project radially inwardly in relation to the internal surface of said skirt of the electrical connector means and which are in an annular space between the external surface of said seismic mass and the cylindrical internal surface of the skirt, there being a respective said electrically conductive block disposed in each said recess.

13. An accelerometer according to claim 1, wherein said damping means between the body and the electrical connector means comprise axial damping means.

14. An accelerometer according to claim 1, wherein said damping means comprise radial damping means.

15. An accelerometer according to claim 1 and intended for the detection of pinking of an internal combustion engine.

* * * * *